United States Patent [19]

Wallberg

[11] 4,270,559

[45] Jun. 2, 1981

[54] METHOD FOR INSTALLING AN ADJUSTABLE FLOW RESTRICTING VALVE MEMBER IN A TUBULAR PIPE, AND A VALVE DEVICE FOR UTILIZATION OF THE METHOD

[76] Inventor: Kurt-Åke Wallberg, Lindholmens Trädgårdsstad, Vallentuna, Sweden, S-186 00

[21] Appl. No.: 35,906

[22] Filed: May 3, 1979

[30] Foreign Application Priority Data

May 8, 1978 [SE] Sweden ............................... 7805232

[51] Int. Cl.³ ...................... F16L 55/07; B23P 15/00; F16K 1/22
[52] U.S. Cl. .................................... 137/15; 137/318; 251/305; 251/367; 29/157.1 R
[58] Field of Search .............. 29/157.1 R, 157 R, 445; 137/15, 315, 320, 318; 251/305, 306, 367, 146

[56] References Cited

U.S. PATENT DOCUMENTS

| 2,297,013 | 9/1942 | Nichols et al. | 29/157 T |
| 2,676,604 | 4/1954 | Senna | 251/305 |
| 3,192,613 | 7/1965 | Allen | 29/157.1 R |
| 3,749,108 | 7/1973 | Long | 137/15 |
| 3,948,282 | 4/1976 | Yano | 137/15 |
| 4,029,118 | 6/1977 | Merideth | 137/15 |

Primary Examiner—Daniel C. Crane
Attorney, Agent, or Firm—Holman & Stern

[57] ABSTRACT

A method for installing an adjustable flow restricting valve member in a tubular pipe, and a valve device for utilization of the method, including the steps of cutting a slot extending in the longitudinal direction of the tubular pipe, inserting a mainly plane valve member through said slot, said valve member being arranged with a stem extending through the slot and facilitating a rotary movement of the valve member from a position corresponding with the length axis of the tubular pipe to a position in contact with the internal wall surface of the tubular pipe, said stem also extending through a member arranged to prevent communication between a medium within the pipe and the outside atmosphere.

12 Claims, 5 Drawing Figures

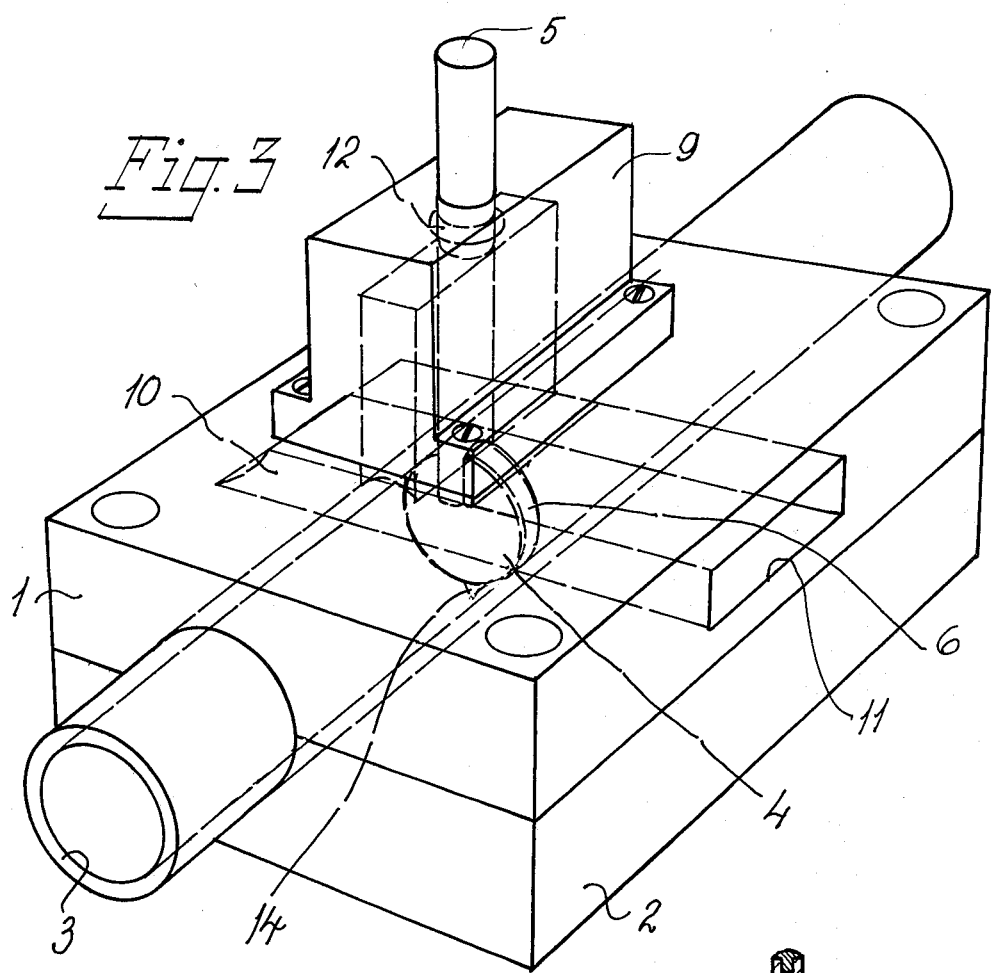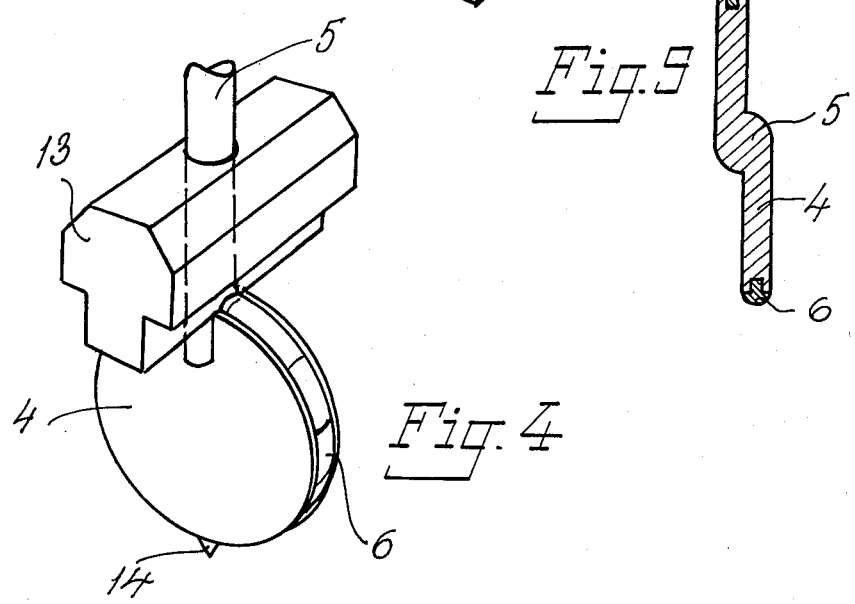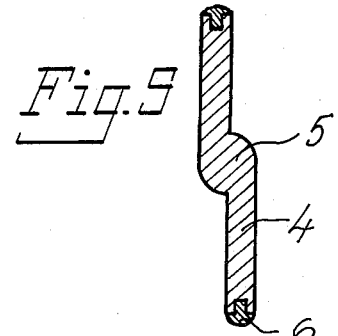

METHOD FOR INSTALLING AN ADJUSTABLE FLOW RESTRICTING VALVE MEMBER IN A TUBULAR PIPE, AND A VALVE DEVICE FOR UTILIZATION OF THE METHOD

BRIEF SUMMARY OF THE INVENTION

The present invention relates to a method for arranging an adjustable flow restricting valve member at a tubular pipe, and a device for utilization of the method.

It is previously known to attach various types of adjustable flow restricting valve members to a tubular pipe by means of connectable flanges, screw threads, welding or other known methods, the valve member being ball valves, disc valves or other previously known types of valve members. With regard to previously known methods of attachment, the valve member can be regarded as a separate part, having an inlet and an outlet member joining to adjacent end portions of the tubular pipe. Said end portions of the tubular pipe are arranged with suitable means of connection for the valve member, such as connecting flanges, tubular couplings with a connecting screw thread or other previously known methods.

An obvious disadvantage with previously known types of adjustable flow restricting valve members is the method in which they are attached to a tubular pipe, since the tubular pipe must be interrupted, said interruption corresponding to the attachment dimensions for the valve member. This makes it impossible, e.g. to attach a valve member at a tubular pipe in use, utilized for transport of a medium. A further disadvantage is that the means of attachment utilized for the valve member are both time-consuming and expensive to apply at the connecting point of the tubular pipe, and that there is an obvious risk of leakage, e.g. caused by fatigue, vibrations, changes in temperature, etc. Furthermore, the sealing parts of the valve members, such as the valve disc, valve cone, valve ball or similar parts can not be made available for service, unless the media flow is interrupted and the valve member is removed as a complete unit from the tubular pipe. In many types of valves, the valve member is also acting as a flow reducing or turbulence causing part in a pipe system, even if the valve member is arranged in a maximum open position, e.g. valve members of disc type.

The object of the present invention is to disclose a method to arrange an adjustable flow restricting valve member in a tubular pipe, and a device for utilization of the method, eliminating all the above mentioned disadvantages relating to previously known types. The method according to the present invention facilitates installation of adjustable flow restricting valve members at desired positions in a tubular pipe or a pipe system with a minimum of installation time and with considerably reduced cost, both for the manufacture of the valve member and for the installation of same. It is also possible to attach the valve member to tubular pipes in use for transport of a medium, and to service the valve member without interrupting the flow of the medium. Furthermore, it is also possible to achieve a completely open valve position, in which the cross-sectional area of the tubular pipe is maintained completely unchanged.

The method according to the present invention is mainly characterized by the characteristic features disclosed in the following main claim, as well as of the further characteristic features disclosed in the subclaims, and the characteristic features of the device according to the present invention are disclosed in the subclaims relating to a device for utilization of the method according to the present invention.

BRIEF DESCRIPTION OF THE SEVERAL VIEWS OF THE DRAWINGS

In order to facilitate the understanding of the present invention, a number of basic embodiments are more fully described below, reference being made to the accompanying drawings.

FIG. 3 is a schematic perspective view of a second embodiment of a valve member according to the method of the present invention, arranged with a tubular pipe.

FIG. 4 is a perspective view of the adjustable flow restricting member included in the valve member shown in FIG. 3, arranged with a turbulence restricting member.

FIG. 5 is a section along the horisontal centre axis of a slightly modified embodiment of a disc-shaped adjustable flow restricting member.

DETAILED DESCRIPTIONS

Figure 1:
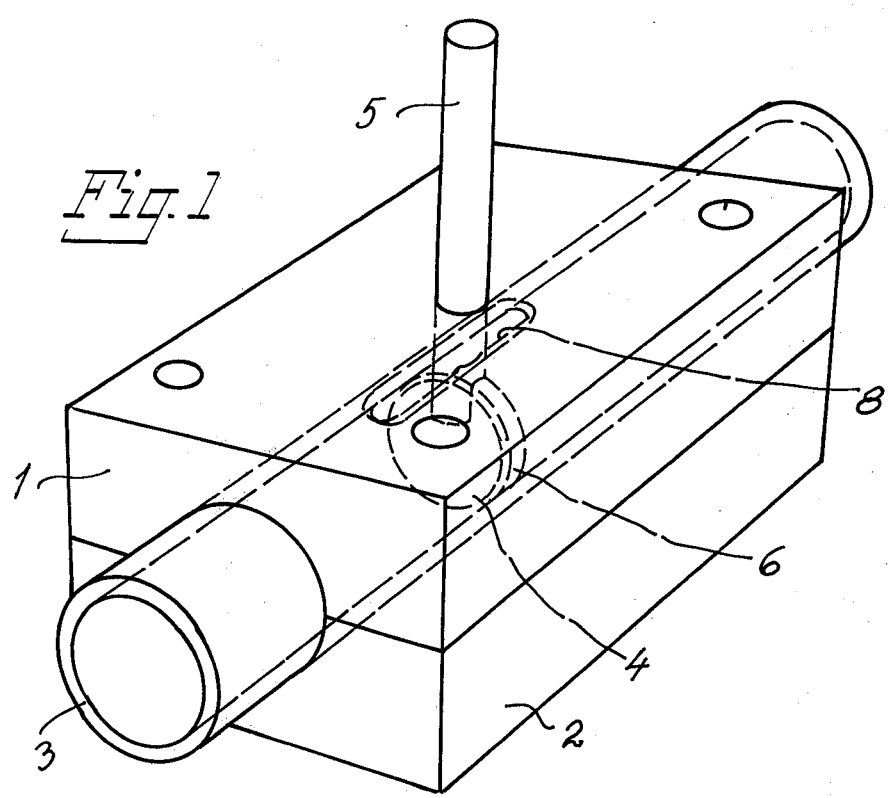
FIG. 1 is a schematic perspective view of a first basic embodiment of a valve member according to the method of the present invention, attached to a tubular pipe.

In the drawings, reference numerals 1 and 2 indicate two attachable housings, each part 1, 2 being arranged with a centrally located groove having a mainly half-circular cross-section, which grooves are arranged to embrace the outer peripheral portion of a tubular pipe 3, against which the housings 1, 2 are attached. Said housings 1, 2 are preferably attached to each other by means of screws or bolts, said members only being shown as circular holes in the housings 1, 2.

Figure 2:
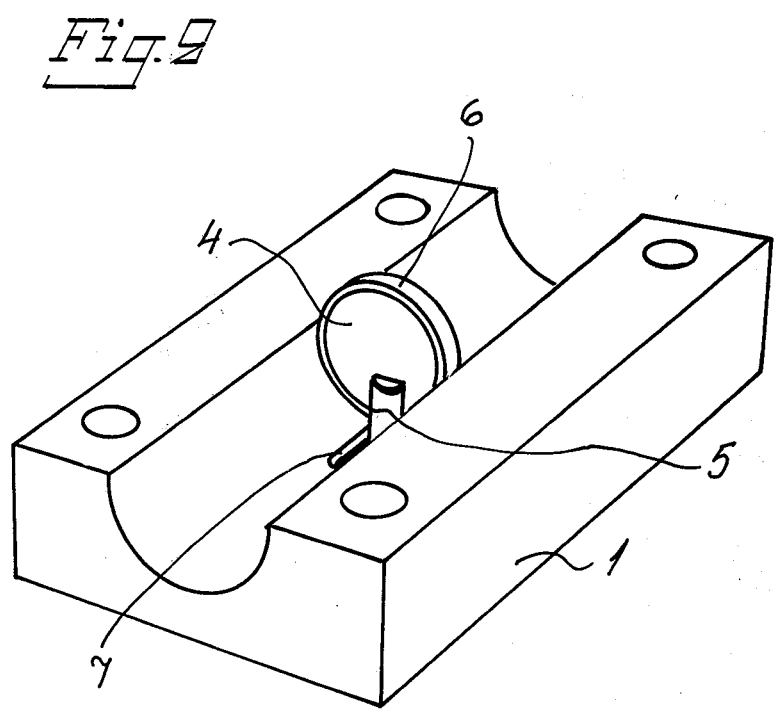
FIG. 2 is a perspective view of the upper part of the valve member shown in FIG. 1, shown in a reversed position to FIG. 1.

The basic embodiment shown in FIGS. 1 and 2 includes also a cylindrical flat valve member 4, attached to an axle 5 extending through one of the housings 1. Said valve member 4 is also preferably arranged with a peripheral surrounding sealing member 6. With reference to FIG. 2, a longitudinally extending part 7 is also provided located centrally in relation to the axle 5, extending in the direction of the half-circular groove, and arranged with a centrally located through hole for the axle 5.

When attaching the valve member disclosed in FIGS. 1 and 2, a peripheral wall portion of the tubular pipe 3 is removed at the point where a valve member is intended to be arranged, thus forming a through slot 8 extending in the direction of the tubular pipe 3. The length of said slot 8, and the width, is arranged to slightly exceed the diameter and the width of the valve member 4 with surrounding sealing member 6. The longitudinally extending member 7 is arranged with a length and a width corresponding to the slot 8 and also extending from the half-circular groove to an extent corresponding to the wall thickness of the tubular pipe 3.

The slot 8 is cut in the tubular pipe 3 by means of milling, grinding, or any other previously known method, whereafter the housing part 1 with related valve member 4 is attached, and the valve member 4 is during attachment arranged extending in the direction of the groove 8. Said housing part 1 is thereafter attached in a previously known way to the second housing part 2, the housing parts 1, 2 thus being arranged in a position embracing the tubular pipe 3, as shown in FIG. 1.

By means of a rotary movement to the axle 5, the valve member 4 can thereafter be brought to take up desired flow reducing positions in the surrounding tubular pipe 3 and also a position with the outside peripheral portion of the valve member 4 in contact with the inside peripheral wall of the tubular pipe 3, thus preventing a media flow through the tubular pipe 3.

The embodiment described above is regarded as a first and basic embodiment, based on the possibility of providing a slot 8 extending in the direction of a tubular pipe 3, and to insert through said slot 8 a cylindrical and mainly plane valve member 4, said slot 8 and valve member 4 being arranged surrounded by two attachable housing parts 1, 2 embracing the tubular pipes 3, said valve member 4 being arranged with an axle 5 attached to the valve member 4 and extending through one of the housing parts 1 and thus being rotatable between a position in contact with the inside peripheral wall of the tubular pipe 3, and a position parallel in relation to the length axis of the tubular pipe 3, in order to faciliate maximum flow of a medium flowing through the tubular pipe 3.

In order to improve the sealing properties, when the valve member 4 is arranged in contact with the inside peripheral wall of the tubular pipe 3, the valve member 4 is advantageously arranged with a surrounding sealing member 6, and in order to reduce existing turbulence at the slot 8 in the tubular pipe 3, a turbulence restricting longitudinally extending member 7 is preferably arranged in the slot 8.

The embodiment described with reference to FIGS. 1 and 2 makes it thus possible to attach a valve member to a tubular pipe 3 utilizing simple tools and a simple method of installation. However, this method is based on the fact that the slot 8 can be cut, which is not always possible with regard to tubular pipes 3 in use, when cutting or grinding tools are utilized, since problems such as leakage from the tubular pipe 3 is unavoidable.

Also this problem can be overcome according to the method of the present invention and a basic embodiment for this object is disclosed in FIG. 3.

Correspondingly to the previously described embodiment, two housing parts 1, 2, attachable to each other, are utilized, arranged to be joined embracing a tubular pipe 3. In difference to the previously described embodiment, the housing part 1, through which the axle 5 extends, is arranged with a housing 9 surrounding the axle 5, attached to the housing part 1 by means of screws, and arranged extending from said housing part 1 and surrounding the axle 5. Furthermore, said housing 9 is also arranged with a recess open in direction towards the tubular pipe 3, i.e. also extending through the housing part 1. Said housing part 1 is also arranged with a groove 11 extending cross-wise to the length axis of the tubular pipe 3, in which a cutting member 10 is moveably arranged. The restricting surface of the groove 11 adjacent to the second housing part 2 is arranged in such a relationship to the adjacent peripheral wall portion of the tubular pipe 3, that a movement of the cutting member 10 in direction towards the tubular pipe 3 causes a peripheral wall portion to be removed by a cutting or planing effect, whereby a through groove 8 extending in longitudinal direction of the tubular pipe 3 is produced. The cutting member 10 is also advantageously arranged to take up a predetermined position in relation to the housing part 1 after accomplished movement, and arranged with a through groove extending cross-wise in relation to the direction of movement, intended to faciliate insertion of the valve member 4 from a position surrounded by the recess in the housing 9 to a position surrounded by the tubular pipe 3. Alternatively, the cutting member 10 can be arranged to be moved back to the original position.

The device shown in FIG. 3 is attached to a tubular pipe 3 at a desired point of localisation, the valve member 4 being arranged in a position surrounded by the housing 9 and the cutting member 10 being arranged in a position away from the tubular pipe 3. By means of an applied force, an explosive charge or any other suitable method, the cutting member 10 is thereafter moved in direction towards the tubular pipe 3, thus removing a peripheral wall portion of the tubular pipe 3, and forming a through slot 8 extending in longitudinal direction of the tubular pipe 3. The axle 5 is thereafter moved in direction towards the tubular pipe 3 if the above mentioned slot is arranged in the cutting member 10, otherwise the cutting member is first moved back to the original position, whereafter the valve member 4 is moved to a position surrounded by the tubular pipe 3. Any medium existing in the tubular pipe 3 can obviously flow into the recess of the housing 9 during these operations, but said housing is arranged with a suitable sealing member 12, e.g. an O-ring at the axle 5, which prevents leakage.

When the valve member 4 has been moved in the above described manner to a position surrounded by the tubular pipe, a rotary movement applied to the axle 5 causes same to take up desired positions in relation to the surrounding inside peripheral wall of the tubular pipe 3, from a completely closed to a completely open position.

It should be mentioned, that the valve member 4, when arranged in a parallel position to the length axis of the tubular pipe 3, obviously causes a certain, even though a very little, flow restriction. Also this resistance can be completely removed, by arranging the valve member 4 in a completely open position and by an axial movement of the axle 5 in direction from the tubular pipe 3, whereby no further restriction for maximum through flow exists.

By moving the valve member 4 to the original position surounded by the housing 9, and thereafter moving the cutting member 10 to a position in which the cutting member 10 completely seals off the slot 8, the housing 9, the valve member 4 and the axle 5 can be removed from the housing part 1, without any leakage from the tubular pipe 3. The original through flow area of the tubular pipe is also restored and the valve member 4 is made available for service or replacement. Service is thus possible without any need for interruptions in the use of the tubular pipe, or interruptions in the media flow.

In order to reduce turbulent flows in the area of the tubular pipe 3 where the slot 8 is cut, the slot 8 can be sealed with a wall replacing member 13, advantageously arranged axially unmoveable but rotatably attached to the axle 5 adjacent to the valve member 4. Such a member 13 is indicated in FIG. 4. When the valve member 4 is moved down to a position surrounded by the tubular pipe 3, the sealing member 13 arranged adjacent to the valve member 4 is also moved into the slot 8, said member 13 having a length corresponding to the length of the slot 8 and said member 13 being adjacent to the valve member 4 and insertable into the groove 8, also having a thickness mainly corresponding to the wall thickness of the tubular pipe 3.

It should be noted, that said sealing and wall replacing member 13 in certain cases of application is not necessary since the slot 8 extending in the direction of the tubular pipe 3 only causes an extremely small flow restricting and turbulence causing effect.

In order to avoid the valve member 4 and/or the axle 5 to be made subject to a deformative bending action, caused by pressure influence from the flowing medium against the valve member 4, the valve member 4 is advantageously arranged with a pointed portion 14 in the extended direction of the axle 5 and in relation to the point of attachment of the axle 5 to the valve member 4 at an opposed peripheral portion. Said pointed part 14 is arranged to partly penetrate the tubular pipe 3 at an inside peripheral wall surface opposed to the slot 8, whereby a guiding and supporting member for the valve member 4 is achieved.

With reference to the embodiments shown in FIGS. 1-4, the valve member 4 is shown as a mainly plane, disc-shaped circular part. However, the valve member 4 can be modified in a number of different ways, e.g. in order to obtain an improved contact and sealing effect against the inside periferial wall surface of the surrounding tubular pipe 3. An example of such a modification is shown in FIG. 5 as a cross-sectional view through a valve member 4. The valve member 4 shown includes two half-circular parts, extending from two opposed peripheral portions of the axle 5 in an internally parallel but axially displaced relationship to each other, whereby an excentric effect is achieved during a rotary movement, which causes an improved contact between the valve member 4 and the inside wall surface of the tubular pipe 3, and an improved sealing effect between the sealing member 6 surrounding the valve member 4 and the inside wall surface of the tubular pipe. The valve member 4 can obviously also be modified in other ways, e.g. by arranging the surrounding edge portion inclined or of any other shape, intended to faciliate improved contact properties against the inside wall surface of the surrounding tubular pipe 3.

The present invention discloses a previously unknown method to attach an adjustable flow restricting valve member to a tubular pipe in a simple, fast and efficient manner, including the operations: to first cut a through slot 8 in longitudinal direction of a tubular pipe 3, to insert through said slot a preferably flat circular valve member 4, said valve member 4 being arranged to take up a sealing contact position against the inside peripheral wall surface of the tubular pipe 3, and to faciliate adjustment into desired flow restricting positions in relation to the length axis of the tubular pipe 3.

The above mentioned characteristic features are only a number of basic features, since the valve member 4 can also be arranged to faciliate a movement to a position outside the tubular pipe 3, thus faciliating maximum through flow, and a further member 10, preferably a cutting member 10, can also be arranged to cut the slot 8 in the tubular pipe 3, and to be moved to a position sealing off the slot 8, when the valve member 4 is arranged in a position outside the tubular pipe 3. Further characteristic features are disclosed in the previous description, as well as in the following claims.

Accordingly, the present invention is not in any way restricted to the basic embodiments shown and described, which only serve as examples of devices within the scope of the present invention.

I claim:

1. A method of installing an adjustable flow restricting valve in a tubular pipe, comprising, cutting an elongated slot having major and minor axes through the pipe, the major axis extending parallel to the longitudinal axis of the pipe, providing a valve member having a flat face and a peripheral surface configuration corresponding to the interior of said pipe, providing an elongated stem on said valve member, aligning said valve member with said slot with the flat face parallel to said major axis, inserting said valve member through said slot to a position surrounded by said pipe, with said stem extending through said slot to facilitate a rotary movement of said valve member between a position in contact throughout substantially its entire peripheral surface with the internal peripheral wall surface of said pipe, thus preventing a media flow therethrough, to desired adjustable positions in relation to the length axis of the pipe thus restricting a media flow to a desired extent through the pipe and sealing the area between said slot and said stem.

2. A method according to claim 1 further comprising enclosing said pipe within at least two attachable housing parts arranged to embrace the tubular pipe in the area surrounding said valve with said valve stem extending rotatably through one of said housing parts.

3. A method according to claim 1 wherein the step of cutting said slot is by milling, grinding, sawing, or reciprocating cutter, and the housing parts are thereafter attached to each other in a position embracing the tubular pipe.

4. A method according to claim 1 wherein the cutting of said slot in the tubular pipe is by providing a reciprocating cutter member in a position to cut through the pipe wall to produce a slot in the inner peripheral wall portion of the pipe slightly larger than said valve member, driving said cutter by a force so that the cutting edge portion removes said peripheral wall portion, thus forming said through slot extending in the longitudinal direction of said pipe, and returning said cutter to its initial position to open said slot to receive said valve member.

5. An adjustable flow restricting rotary valve for use with a tubular pipe conducting a fluid, comprising at least two housing members connected together to form a unitary housing body completely enclosing a length section of said pipe, means for connecting said housing members together, each of said housing members having a groove in the surface which faces another housing member, said grooves having a configuration conforming to the exterior configuration of said pipe to form a tubular bore which closely embraces said pipe section, a valve member positioned in one of said grooves in one of said housing members, a valve stem extending through said one of said housing members in rotatable relationship therewith and being connected at its inner end to said valve member, said valve member being substantially flat and having a peripheral surface configuration conforming to the inner peripheral configuration of said pipe so that said valve may be rotated by said stem into varying flow restricting positions in said tubular pipe, said valve member being in contact throughout substantially its entire peripheral surface with said inner peripheral configuration of said pipe when in closed position, an elongted slot in said pipe slightly larger than and having a configuration conforming to the largest cross-section of said valve member, the longer dimension of said slot being parallel with the longitudinal axis of said pipe, so that when assembled said valve member is insertable through said slot and positioned within said pipe, and means to seal said slot.

6. The valve as claimed in claim 5 wherein said means to seal said slot comprises an elongated plug element having a peripheral configuration which conforms to said slot to sealingly close said slot, and a hole in said plug member through which said valve stem extends for rotational movement therein.

7. The valve as claimed in claim 5 wherein said one of said housing members in which said valve member is positioned has a block member attached thereto on its outer face, said block member having an internal recess of a shape and size to receive said valve member when held above said outer face, a second elongated slot through said outer face aligned with said slot in said pipe having a size and shape to allow said valve member to pass therethrough, a hole through said block between said recess and the outer face of said block to rotatably receive said valve stem.

8. The valve as claimed in claim 7 further comprising a cutter slidably contained in said one of said housing members atapted to reciprocate in a direction transverse to said pipe and having a cutting edge to cut said slot in said pipe when driven by a force, said cutter being retractable into a position in which said slot is open to said recess to allow said valve member to be moved from said recess into said pipe.

9. The valve as claimed in claim 8 wherein said one of said housing members has a rectangular hole extending from one side edge of said one of said housing members in a direction transversely to said pipe and beyond said pipe section to be cut away to produce said slot, said cutter being disposed within said rectangular hole for reciprocating movement therein.

10. The valve as claimed in claim 9 wherein said cutter has a configuration conforming to the configuration of said rectangular hole and functioning as a seal means to seal said slot when said valve is removed from said pipe and said cutter is moved to a position completely covering said slot.

11. A valve according to any of claims 5–10 wherein said valve member is provided with a peripheral sealing member to make sealing contact against the internal wall surface of said pipe when the valve member is rotated to a position to stop flow in said pipe.

12. A valve according to any of claims 5–10 further comprising the valve member is provided with an outwardly extending member extending oppositely to said valve stem and adapted to partly penetrate into the inner wall of said pipe opposite to said slot thus forming a supporting pivot for the valve member.

* * * * *